Patented Aug. 6, 1946

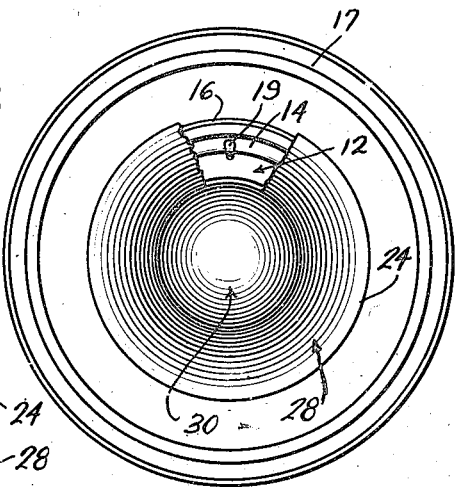
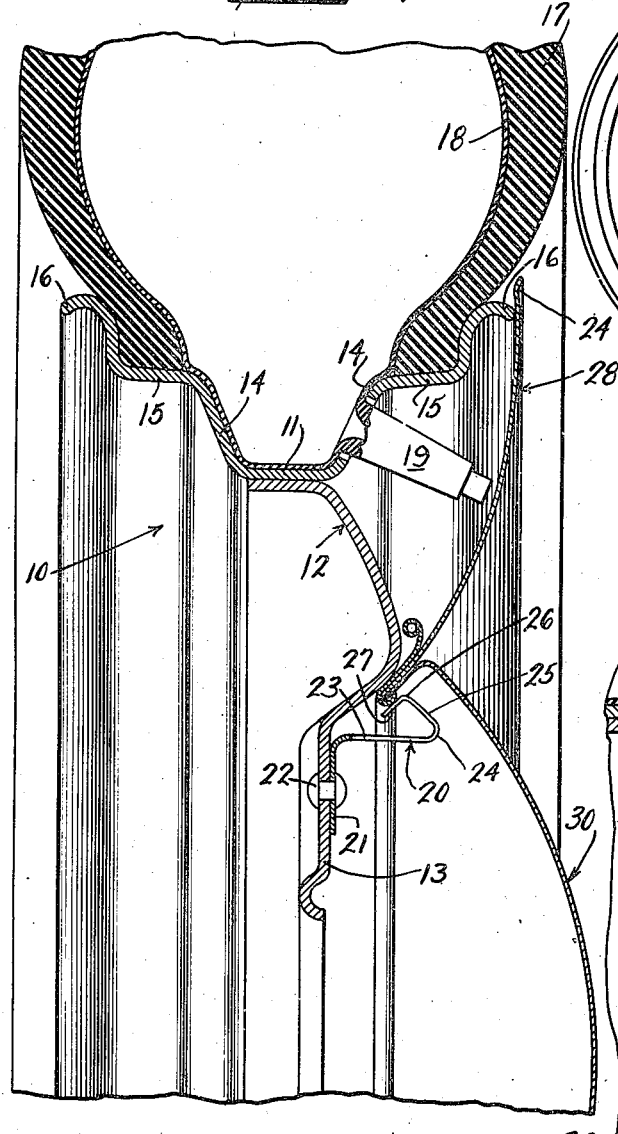
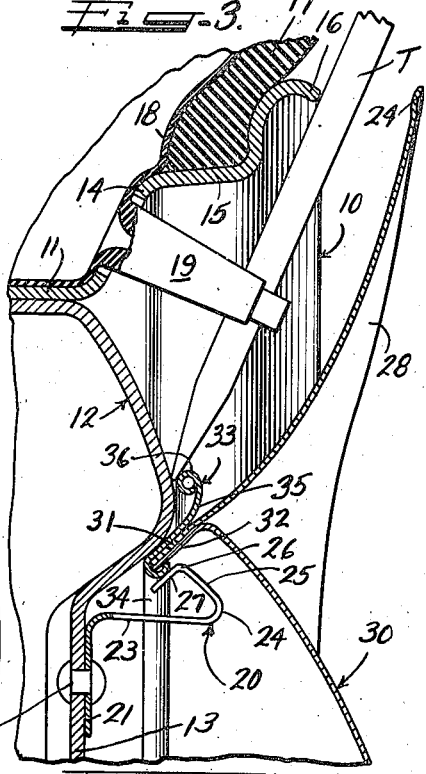

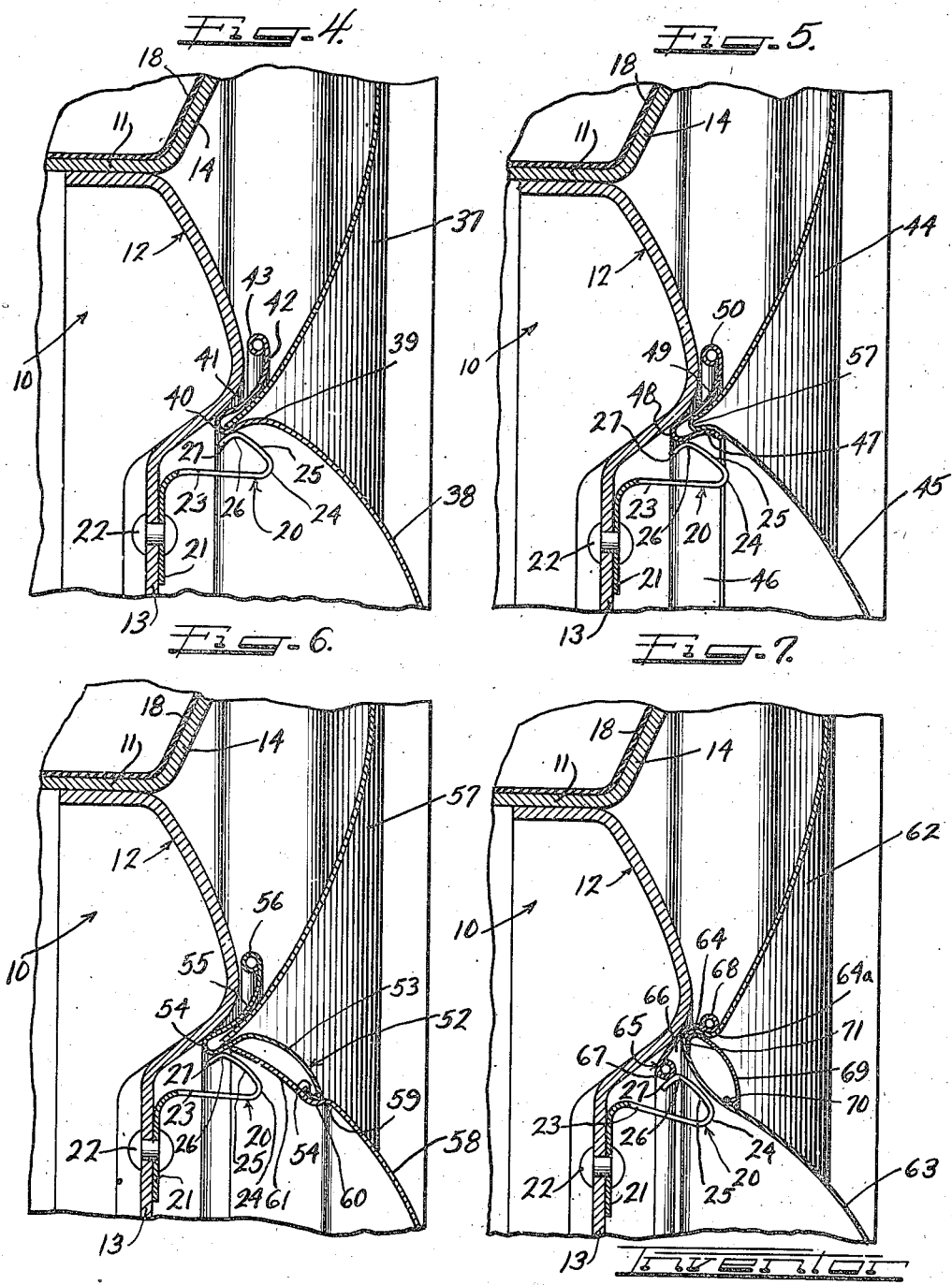

2,405,389

UNITED STATES PATENT OFFICE 2,405,389

WHEEL STRUCTURE

George Albert Lyon, Allenhurst, N. J.

Application April 10, 1944, Serial No. 530,352

9 Claims. (Cl. 301—37)

This invention is directed to an improved wheel structure and relates more particularly to an improved cover assembly for disposition over the outer side thereof to conceal the tire rim and central load bearing portion of the wheel.

It is an important object of the present invention to provide an improved cover assembly together with an improved arrangement for detachably securing the cover assembly to the wheel structure.

It is a further object of the present invention to provide for disposition over the outer side of a wheel structure a cover assembly having a radially outer part formed from a locally resiliently, temporarily, flexible material such as sheet synthetic plastic or the like, whereby the rear side thereof may be rendered accessible by local flexure of the cover to obtain access to a tire valve stem, wheel balancing weights or other appurtenances concealed thereby, this cover portion being maintained upon the wheel by a reinforced, more rigid retaining member.

It is still another object of the invention to provide an improved cover assembly of the above character with an improved retaining arrangement, whereby the cover may be resiliently maintained upon the wheel in snap-on pry-off relationship, the retaining means including a novel arrangement for receiving the point of a pry-off tool, whereby the tool is prevented from engaging the sheet plastic material and injuring the same during a pry-off operation.

It is still a further object of the invention to provide an improved cover assembly having a plurality of concentrically aligned circular parts, there being an improved retaining arrangement for maintaining the parts together as a unitary assembly so that they may be applied to the wheel structure and removed therefrom as such, this retaining assembly serving as a rigidifying, reinforcing medium and also serving to engage the retaining portions of the wheel, thereby to protect the plastic cover from damage or distortion by virtue of the retained relationship.

It is still another object of the present invention to provide for disposition over the outer side of a wheel structure a cover assembly including a radially outer frangible, resiliently, locally, temporarily flexible portion formed from a resilient material such as sheet plastic or the like, this cover portion having a radially inner part which is wedgingly engaged in a more rigid circular retaining element, the retaining element having a part arranged for detachable, snap-on pry-off engagement with retaining members on the wheel and also including a shouldered portion accessible for engagement by a pry-off tool, whereby the cover may be pried from the wheel as by a screw driver or the like, without the point of the tool engaging and damaging the frangible cover member.

In accordance with the general features of the invention as shown in one embodiment thereof, there is provided herein a cover assembly having a radially outer part and a central circular part, each of these parts having adjacent flanges lying in surface abutment with one another and a more rigid, reinforcing retaining annulus formed from sheet metal, this retaining annulus having a part arranged to lie in surface abutment with the adjacent flanges of the cover parts, having a radially inner portion curled therearound to hold the cover parts permanently together and also serving as a snap-on bead for the cover assembly and also having a radially outwardly extending shouldered portion adapted to receive a point of a pry-off tool or the like whereby the cover and particularly the retaining member thereof may be urged radially outwardly over resilient retaining members on the wheel.

In accordance with the general features of other forms of the invention shown herein there is provided a multipart cover assembly a radially annular part formed from sheet synthetic plastic material or the like, whereby it is self-sustaining as to form and yet may be temporarily distorted to render the rear side thereof accessible and an annular metal retaining member having a substantially axially inwardly extending groove therein for receiving a radially inner circular portion of the cover in retained engagement, one wall defining the groove serving to receive the radially inner part of the cover in attached relationship and the other wall defining this groove serving to urge a radially outwardly disposed portion of the cover radially inwardly to provide a wedged relationship, whereby the first named, retained part of the plastic cover member is forced tightly into its retained position within said groove. If desired, the radially inner portion of the annular retaining member may be formed to provide a circular, axially outwardly exposed ornamental member for the wheel.

In accordance with still another form of the invention shown herein, there is provided a disklike cover member including a radially outer portion and a central circular portion formed integrally therewith, said cover being formed from sheet synthetic plastic material or the like, whereby it is self-sustaining as to form and yet may be temporarily, locally flexed so as to render the rear side thereof accessible and so as to immediately snap back to initial configuration when distorting pressures are relieved therefrom, the junction of the cover portions comprising a generally axially inwardly extending circular bead arranged to wedgingly fit between the walls of a circular metal retaining member formed by said walls to include a generally axially inwardly extending bead, one of said walls being arranged to retainingly receive one side of the bead of the plastic cover member, and the other of said walls being arranged to pressingly urge said first named wall of the bead on the cover into its retained engagement with the respective wall of the retaining means, the axially inner portion of the bead in the retaining member serving as a snap-on bead for retainingly engaging resilient retaining members on the wheel.

In accordance with still another feature of the present invention as shown herein there is provided a circular cover member including a radially outer annular portion formed from sheet synthetic plastic material and a central circular hub cap simulating cover portion joined integrally thereto and also formed from sheet synthetic plastic material, the junction between said cover portions including a generally radially outwardly extending bead, and a reinforcing, annular metallic ornamental ring having a radially outer dimension whereby it fits snugly into the groove formed by said bead in the cover to back up the walls of said cover bead, there also being provided an annular retaining member having a radially outer portion formed to provide a radially inwardly facing groove for receiving said reinforced bead of the cover as backed up by said ornamental ring for maintaining the parts permanently together as a unitary structure, said retaining member also having a generally radially inwardly extending snap-on bead for retainingly, yet detachably engaging resilient retaining members on the wheel structure. If desired, the retaining annulus may be provided at the radially outer part thereof with a bead for receiving the point of a pry-off tool, whereby the assembly may be easily removed from the wheel structure without engagement of the point of the pry-off tool against the relatively frangible plastic cover member.

It is still a further object of the present invention to provide for disposition over the outer side of a wheel structure having a tire rim and a central load bearing portion, a cover assembly including a radially outer annular marginal portion which extends from a point radially inwardly of the junction between the tire rim and the central load bearing portion, radially outwardly over the edge portion of the tire rim and a central circular hub cap simulating cover portion, said radially outer annular portion having a cross-sectional configuration whereby it generally simulates the side wall of a tire in the tire rim, thereby to give the appearance of being a part thereof and to appear as a continuation thereof and furthermore to give the appearance of being the white side wall of a massive tire when colored white.

It is another object of the present invention to provide for disposition over the outer side of a wheel structure a cover assembly including a multiplicity of parts, these parts being so arranged that they are securely retained together as a unitary structure and may be applied to and removed from the wheel as such.

Other objects and advantages of the invention will become apparent from the following description and accompanying drawings in which:

Figure 1 is a side elevational view of a wheel structure embodying one form of my invention, a portion of the cover being broken away for illustrative purposes;

Figure 2 is an enlarged, fragmentary, radial cross-sectional view of the construction shown in Figure 1;

Figure 3 is a still further enlarged, radial, cross-sectional view of the constructions shown in Figures 1 and 2;

Figure 4 is an enlarged, fragmentary, radial cross-sectional view of a modified form of my invention;

Figure 5 is an enlarged, fragmentary, radial cross-sectional view of a further modified form of my invention;

Figure 6 is an enlarged, fragmentary, radial cross-sectional view of another modified form of my invention; and Figure 7 is an enlarged, fragmentary, radial cross-sectional view of still a further modification of my invention;

It will be understood that the embodiments shown herein are for illustrative purposes only and may be changed or modified without departing from the spirit and scope of the invention as set forth in the appended claims.

As shown in the various embodiments herein the reference character 10 designates generally a multi-flange, drop center type of tire rim which is connected as by riveting or welding or the like through a base flange 11 to a central load bearing portion or spider 12 which includes a central bolt-on flange 13. The drop center rim 10 is further provided with opposite side wall flanges 14, opposite intermediate flanges 15 and opposite edge portions 16. A suitable tire 17 having an inner tube 18 and a valve stem 19 is mounted upon the rim, one of the side walls 14 having an orifice through which the valve stem 19 may project. Since the tire and wheel structure shown herein is identical throughout the various embodiments, the parts thereof are similarly identified in each of the views.

In each of the embodiments herein retaining means on the wheel structure may take one of any well known forms, however, as shown herein, this retaining structure includes a plurality of spring clips 20 secured integrally to an annular, radially inwardly extending flange 21 which is secured to the bolt-on flange 13 of the wheel in any suitable manner such as by rivets 22 or the like. These spring clips 20 are circumferentially spaced around the wheel and include resilient arms 23 which extend outwardly from the flange 21. The arms 23 are bent axially inwardly upon themselves as at 24 to provide generally radially outwardly, axially inwardly, obliquely disposed cam fingers 25 which are in turn bent radially inwardly as at 26 to form cam fingers 27.

The cover assembly shown in Figures 1, 2 and 3, includes a plurality of cover parts including a radially outer annular part 28 formed from sheet synthetic plastic material or the like, whereby it is self-sustaining as to form and yet may be locally, temporarily, resiliently flexed axially outwardly as shown in Figure 3 to render the rear side thereof accessible and to provide for adjustment of wheel balancing weights, application of the nozzle of an air hose to the valve stem 19 or the insertion of a pry-off tool T for removal of the cover assembly from the wheel. The cover part 28 is formed with a cross-sectional configuration, whereby the outer margin thereof which is flared slightly outwardly as at 29 extends beyond the edge portion 16 of the tire rim and the cover part extends radially inwardly beyond the junction between the tire rim 10 and the central load bearing portion 12 to a point adjacent the bolt-on flange 13. The cover assembly is completed by the provision of a central circular hub cap simulating member 30 which may likewise be formed from plastic material or, if desired, may be formed from a more rigid material such as stainless sheet steel or the like, this stainless steel being well adapted to be finished in a high luster to give a highly ornamental appearance to the wheel.

As will best be seen from Figure 3, the radially inner marginal portion 31 of the cover member 28 and the radially outer bent back marginal portion 32 of the cover member 30 are disposed in surface to surface abutment when the cover structure is assembled. This surface to surface abutment of the flanges 31 and 32 is permanently retained by virtue of a rigid retaining annulus 33.

The retaining annulus 33 is preferably formed from sheet steel and is provided at the radially inner margin thereof with a rolled part 34 which, as will be seen presently, serves as a snap-on bead for the cover assembly and also curls back into pressing engagement against the flange 32 thereby to clampingly engage the flanges 31 and 32 together. The annular retaining member 33 is further provided at the radially outer part thereof with a radially outwardly extending flange-like portion 35 terminating in a rolled peripheral bead 36.

It will be understood that the cover parts 28 and 30 and the annulus 33 are disposed relative to one another as shown in Figures 2 and 3 during a manufacturing operation before the cover is applied to the wheel. The rolled bead 34 of the retaining member is then formed to secure the parts permanently together as a unit in the relationship shown.

In applying the circular cover assembled as described above to the wheel structure it will be seen that the cover is arranged concentrically against the outer side of the wheel. In this position it will be seen that the peaks or humps 26 of the retaining elements 20 are then disposed in a position radially outwardly of the innermost extremity of the snap-on bead 34. The operator then merely presses the cover axially inwardly against the wheel, whereupon the bead 34 rides upon the cam member 25 to resiliently force the retaining members radially inwardly until the bead 34 has passed the humps 26, whereupon the retaining member 20 will resiliently snap outwardly and the bead will then ride axially inwardly on the cam fingers 27 thereof. When in this position, it will be seen that the cover is securely maintained upon the wheel structure by the resiliency of the members 20.

In order to remove the cover assembly of Figures 2 and 3 from the wheel it will be seen from Figure 3 that the cover 28 may be flexed locally, temporarily outwardly, whereupon the pry-off tool T may be inserted therebehind so that the point thereof is disposed axially inwardly of the radially outer bead 36 of the retaining member 33. The operator then moves the handle of the tool axially inwardly until an intermediate part thereof fulcrums against the edge portion 16 of the tire rim 10, whereupon the point of the tool moves outwardly and draws the cover and particularly the bead 34 over the spring clips. During this action it will be seen that the radially outer part of the retaining member 33 and particularly bead 36 thereof has adequately protected the relatively frangible cover member 28 from being engaged and injured by the point of the pry-off tool.

In the construction shown in Figure 4, the cover assembly includes a plastic radially outer annular portion 37 which is similar to that described in conjunction with Figures 1, 2 and 3 and has attributes similar thereto. In this construction however, the central circular hub cap simulating member 38 is formed from sheet stainless steel so that a high luster may be imparted thereto. This embodiment differs from that previously described principally in that the retaining annulus and the central circular hub cap simulating cover part are formed integrally with one another. The hub cap simulating member 38 terminates at the radially outer edge thereof in a radially outwardly extending hump 39 which is defined on the axially inner side by a flange portion which merges into an axially inwardly extending bead 40 which affords an axially outwardly extending groove in the assembly. The bead 40 is defined on its radially outer side by a generally axially outwardly extending flange 41 which is curved radially outwardly to form a pry-off flange 42 having a reinforcing, axially inwardly facing pry-off bead 43 similar to the construction previously described. In assembling this structure it will be seen that the radially inner margin of the cover member 37 may be forced over the circular hump 39 of the cover 38, whereupon the inner part thereof rests retainingly behind the hump and in the grooved part of the cover formed by the bead 40. When in this position it will be seen that the curved flange 41 serves to back up an intermediate part of the cover member 37 and in fact depress the same radially inwardly, thereby to force the retained margin of the cover 37 behind the hump in a positive manner. With this construction it will be seen that the cover assembly is securely maintained as an integral unit and may be attached to or removed from the wheel structure in a manner described in conjunction with the structure of Figures 1, 2 and 3.

Since the cover 38 and the radially outer retaining assembly thereon are formed from more rigid material such as sheet stainless steel, it will be seen that the relatively frangible plastic cover portion 37 is adequately protected against breakage or undue distortion during the retention or pry-off conditions.

In Figure 5 there is disclosed an arrangement embodying my invention in which the cover is formed from a radially outer annular part 44 and a central circular hub cap simulating part 45, both of these cover parts being formed from synthetic sheet plastic material to have the attributes of the covers described above and both being integral with one another to form a unitary structure. The retaining annulus in Figure 5 includes a radially inner margin formed in an axially outwardly extending flange as at 46, this flange having a radially outwardly facing hump 47. The flange 46 merges with the axially inwardly extending beaded portion 48 which in turn merges with a generally axially outwardly, radially outwardly extending pry-off flange 49 having a reinforcing, axially inwardly rolled pry-off bead 50.

As will be seen from the drawings the junction of the cover parts 44 and 45 comprises a generally axially inwardly extending circular beaded part 51 which is arranged and so dimensioned that it may be snapped over the circular hump 47 of the flange 46. When in this position it will be seen that the radially inner portion of the cover part 44 is in pressing engagement against the flange 49 of the retaining member and thus the portion of the cover which overlies the circular hump 47 is positively urged into tight pressing engagement thereagainst, whereby the cover is securely maintained upon the retaining annulus which is in turn secured to the wheel structure by means of clips 20 operating in the manner of the clips previously described in conjunction with Figures 1, 2, 3 and 4.

In the construction of Figure 5 it will be seen that since the central circular part 45 of the cover is formed from temporarily distortible sheet plastic material, that the release of distorting pressures accidentally imposed thereon to dent the same will result in immediate resumption of the cover to its initial configuration shown.

In the construction of Figure 6 the retaining means 52 is arranged to retainingly receive a plurality of plastic cover members which are concentrically arranged relative to one another so as to provide a unitary structure which may be applied to and removed from the wheel structure as such. In this construction the retaining annulus 52 includes a radially inner margin which is formed into a generally axially outwardly, radially inwardly, obliquely disposed ornamental bead 53 having the terminal edge thereof folded back as at 54 so as to present a smooth surface to an associated cover part. The bead 53 merges into a portion 54 which forms the axially inwardly extending beaded part of the retaining member and this beaded part is defined on its radially outer side by the generally curved, axially outwardly, radially outwardly extending pry-off flange 55 which is in turn provided with an axially inwardly rolled reinforcing pry-off bead 56.

The cover assembly of Figure 6 includes a pair of circular plastic cover members 57 and 58 respectively. The radially outer cover member 57 is annular in form and is arranged to be concentrically aligned with the central circular cover member 58 which simulates a hub cap. It will be seen from the drawings that the cover member 57 has the radially inner margin thereof interfitted with the groove in the retaining annulus in the same manner as shown in the construction of Figure 4.

The central circular hub cap simulating cover member 58 of Figure 6 is provided at an intermediate part thereof with a circular hump 59 which defines one side of an axially inwardly disposed circular groove 60. Extending inwardly from the groove 60 is a peripheral, retaining flange 61 which serves to maintain the cover 58 upon the retaining member. When the cover member 58 is secured to the retaining member it will be seen that the radially inner margin of the retaining member is securely nested in the groove 60 of the cover while the flange 61 of the cover extends axially inwardly so that the radially outer edge thereof is retainingly engaged against a portion of the surface of the retaining member.

Thus it will be seen that the covers and the annular retaining member are secured together in retained relationship and are maintained concentrically with respect to one another as a unitary structure. As in the previous constructions, this unitary structure may be applied to or removed from the wheel as such. In this construction also the cover assembly is maintained upon the wheel structure by means of suitable retaining elements such as spring clips 20.

In the construction of Figure 7 the cover assembly includes, as in the case of Figure 5, a cover member comprising a radially outer sheet synthetic plastic part 62 and a central circular hub cap simulating part 63 which is joined integrally therewith. The junction between these two cover parts comprises a radially inwardly opening grooved portion 64 which affords a radially outwardly protruding circular hump that aids in the maintenance of the cover upon the wheel in a manner to be described presently.

In this form of the invention the retaining annulus 65 is annular in form and includes an intermediate flange part 66 terminating at the radially inner edge in a snap-on bead 67 and at the radially outer edge in a pry-off, reinforcing bead 68. The flange 66 immediately inwardly of the bead 68 is formed with a cooperating groove to nestingly receive the portion 64 of the cover in retaining relationship while the cover is provided with a further grooved portion 64a which nestingly receives the pry-off bead 68. Thus it will be seen that the cover and the retaining annulus are interlockingly engaged to be maintained together as a unitary structure. In order that this interlocking engagement of the parts may be augmented and in order that the cover may be further ornamented, there is provided herein an annular ornamental bead 69 which may be formed from stainless sheet steel or the like, whereby it may have a high luster imparted thereto. This annulus 69 has the radially inner and outer edges turned rearwardly inwardly as at 70 and 71 thereby to present to the plastic cover member a smooth surface. When assembled on the wheel structure the annulus 69 has the radially outer curled margin thereof nested into the groove formed by the portion 64 of the cover, thereby to urge the same tightly into nested relationship with the retaining annulus 66. When the parts are in this position it will be seen that they are maintained tightly together as a unitary structure and may be applied to and removed from the wheel as such.

As in the formerly described constructions, the structure of Figure 7 may be removed from the wheel structure by deflecting the radially outer marginal part 62 of the cover downwardly to permit the entrance of the point of a pry-off tool which is inserted behind the bead 68. When the pry-off tool is then fulcrumed against the edge of the tire rim it will be seen that the point thereof will move outwardly and carry the bead 68 together with the bead 67 outwardly from the resiliently sprung position on the retaining members 20.

From the foregoing it will be seen that there is provided herein a highly efficient retaining structure which securely receives the cover assembly with which it is associated and protects the same, particularly during the pry-off operation. Furthermore it will be seen that there is provided herein an improved retaining structure which is so arranged that one portion of the cover is interlockingly engaged therewith while another portion of the cover is forced or wedged, by means of another part of the retaining means into its retained relationship therewith.

What I claim is:

1. In a cover assembly for disposition over the outer side of a wheel structure, a radially outer annular part and a central circular hub cap simulating part formed concentrically relative thereto with the radially outer margin thereof disposed in surface engagement with the radially inner margin of said annular part, retaining means for maintaining said cover parts together with the adjacent margins in said surface engagement and for reinforcing an intermediate part of the cover, said retaining means including a portion formed to envelop the free ends of said margins of the cover parts to provide a snap-on bead and to maintain said margins together and also including a radially outwardly extending portion formed to receive the point of a pry-off tool, whereby said bead may be moved axially outwardly relative to a wheel over which the cover is disposed.

2. In a cover assembly for disposition over the outer side of a wheel structure, a radially outer, annular cover member and a central circular hub cap simulating cover member, said central circular cover member having a circular, intermediate part thereof formed to provide an axially inwardly extending bead affording an axially outwardly opening groove and having the peripheral margin thereof formed to provide an axially outwardly, radially outwardly diverging flange for receiving the point of a pry-off tool on the axially inner side thereof, said annular cover member having the radially inner margin thereof extending into said groove, the radially inner edge thereof retainingly engaged against the radially inner wall defining said groove, the radially outer wall defining said groove engaging a radially inner intermediate part of the radially outer, annular cover member to pressingly force the inner edge thereof into retained engagement in said groove.

3. In a cover assembly for disposition over the outer side of a wheel structure, a resiliently, locally, temporarily flexible circular cover member having a radially outer marginal part arranged to extend over the radially outer extremity of the wheel and a central circular hub cap simulating part joined integrally thereto, the junction of said cover parts comprising an axially inwardly extending, radially inwardly extending, circular beaded portion, retaining means for maintaining said cover member over the outer side of a wheel structure including a relatively rigid annulus having an intermediate portion formed to provide a generally axially inwardly extending groove arranged to nestingly receive said bead on the cover member, said groove providing at the axially inner part of the retaining member a snap-on bead for retained engagement with the wheel structure, said retaining annulus being further provided with a generally radially outwardly, axially outwardly extending pry-off flange arranged to pressingly force said bead on the cover in a radial inward direction to augment the retained engagement of the bead of said cover member in its nested relationship with the retaining member.

4. In a cover assembly for disposition over the outer side of a wheel structure, a cover member having a generally axially inwardly extending circular bead at an intermediate part thereof, said bead defining one side of a radially opening groove, a retaining annulus having a portion arranged to nestingly receive said bead on the cover member and a portion arranged to nestingly engage in the groove on said cover, a portion arranged to detachably engage with a wheel structure and a pry-off flange extending radially of the wheel structure for pressingly urging said bead into nested engagement with the first named part of the retaining annulus.

5. In a cover assembly for a wheel structure and which assembly includes a central hub cap simulating member and a radially outer annular cover member, a retaining annulus for maintaining the assembly over the outer side of the wheel structure in concentric relationship thereto, said retaining annulus comprising a radially outwardly extending pry-off tool receiving portion, an intermediate portion formed to provide a generally axially inwardly extending bead affording a generally axially outwardly opening groove and having the radially inner margin thereof formed to provide an annular, generally axially outwardly facing ornamental bead portion, said axially outwardly opening groove being arranged to receive the radially inner margin of said radially outer annular cover member to maintain the same as a unitary part of the cover assembly and the radially inner annular bead portion being adapted to retainingly receive therebeneath the radially outer marginal part of said central circular hub cap simulating cover member, said axially inwardly extending intermediate, beaded portion of the retaining member being arranged for detachable engagement with said wheel structure, whereby said cover assembly including said cover members and the retaining member may be secured to and removed from the wheel as a unitary body.

6. In a cover for disposition over the outer side of a wheel structure, a circular resiliently flexible cover member including a radially outer annular part arranged to extend over the radially outer extremities of the wheel and a central circular hub cap simulating part formed integrally with said radially outer cover part, the junction between said cover parts comprising a circular, axially inwardly extending bead affording a generally axially outwardly opening groove provided with a radially inwardly opening portion, retaining means including an annulus having a portion formed to detachably engage with a wheel for maintaining the cover assembly thereon and also having a marginal portion arranged to extend around a circular bead formed by said radially opening portion of said groove in the cover thereby to secure the retaining annulus and the cover together as a unit, and means for augmenting the attached relationship between the cover and the retaining annulus including a circular, ornamental bead member having a radially outer part arranged to interfit in nested relationship in the radially inwardly opening portion of the groove in said cover to force the same tightly against the adjacent part of the retaining annulus, the radially inner portion of said ornamental bead extending inwardly over the cover to rigidify the same and afford an ornamental bead thereon.

7. In a cover structure for a wheel including flanged tire rim and body parts and cover retaining projections in a recess of said body part, a cover including a radially outer resiliently pliable portion for substantially concealing exposed flanges of said rim part and extending radially and axially inwardly to a point on the body part, and a cover retaining member having a snap-on cooperation with said retaining projections on the body part including an inner turned portion for receiving an inner margin of said outer cover portion, and a radially outer portion disposed behind said cover portion and accessible upon flexure of said cover portion for the application of a cover pry-off tool thereto, said inner turned portion defining a shoulder for detachable snap-on engagement with said projections.

8. In a cover structure for a wheel including flanged tire rim and body parts and cover retaining means on the body part, a cover including a radially outer resiliently pliable portion for substantially concealing exposed flanges of said rim part and extending radially and axially inwardly to a point on the body part, and a cover retaining member cooperating with said retaining means on the body part including an inner turned portion for receiving an inner margin of said outer cover portion, and a radially outer portion disposed behind said cover portion and accessible upon flexure of said cover portion for the application of a cover pry-off tool thereto, said inner turned portion having interlocked therewith a central hub cap simulating part.

9. In a cover structure for a wheel including flanged tire rim and body parts and cover retaining means on the body part, a cover including a radially outer resiliently pliable portion for substantially concealing exposed flanges of said rim part and extending radially and axially inwardly to a point on the body part, and a cover retaining member cooperating with said retaining means on the body part including an inner turned portion for receiving an inner margin of said outer cover portion, and a radially inner radially outer portion disposed behind said cover portion and accessible upon flexure of said cover portion for the application of a radially outer cover pry-off tool thereto, said inner turned portion having interlocked therewith a central hub cap simulating part and a bead for concealing the junction of said inner turned portion and said hub cap simulating part.

GEORGE ALBERT LYON.